United States Patent [19]
Oskam et al.

[11] Patent Number: 6,166,154
[45] Date of Patent: Dec. 26, 2000

[54] OLEFIN POLYMERIZATION CATALYST COMPOSITION HAVING INCREASED ACTIVITY

[75] Inventors: John Henry Oskam, Somerset, N.J.; Thomas Henry Peterson, Charleston; David James Schreck, Cross Lanes, both of W. Va.; Purna Chand Sishta, Whitehouse, N.J.; Timothy Todd Wenzel, Charleston, W. Va.; Gregory Todd Whiteker, Charleston, W. Va.; Clark Curtis Williams, Charleston, W. Va.

[73] Assignee: Union Carbide Chemicals & Plastics Technology Corporation, Danbury, Conn.

[21] Appl. No.: 09/312,086

[22] Filed: May 15, 1999

Related U.S. Application Data

[62] Division of application No. 08/781,196, Jan. 10, 1997, Pat. No. 5,912,202.

[51] Int. Cl.$^7$ ...................................................... C08F 4/42
[52] U.S. Cl. ..................... 526/160; 526/127; 526/943; 502/117; 502/126; 502/152; 502/155; 502/104
[58] Field of Search ..................... 526/160, 127, 526/943; 502/117, 126, 152, 155, 104

[56] References Cited

U.S. PATENT DOCUMENTS

| | | | |
|---|---|---|---|
| 3,404,096 | 10/1968 | Lamborn | 252/429 |
| 4,665,047 | 5/1987 | Slaugh et al. | 502/108 |
| 4,767,735 | 8/1988 | Ewen et al. | 502/109 |
| 4,831,000 | 5/1989 | Miro | 502/110 |
| 4,952,540 | 8/1990 | Kioka et al. | 502/9 |
| 5,371,146 | 12/1994 | Takahashi et al. | 525/240 |
| 5,416,178 | 5/1995 | Winter et al. | 526/160 |
| 5,432,139 | 7/1995 | Shamshoum et al. | 502/125 |
| 5,464,906 | 11/1995 | Patton et al. | 525/240 |
| 5,527,752 | 6/1996 | Reichle et al. | 502/117 |

FOREIGN PATENT DOCUMENTS

| | | |
|---|---|---|
| 0 741 146 | 11/1996 | European Pat. Off. . |
| 1300734 | 12/1972 | United Kingdom . |

OTHER PUBLICATIONS

Herfert et al., Makromol. Chem., vol. 194, p. 3167–3182 (1993).
Tait et al., Catalyst Design for Tailor–Made Polyolefins, Eds., Soga and Merano, Kodanska, New York, p. 55 (1972).
Koivumaki et al, Macromolecules, vol. 26, Nov. 21, 5535, Oct. 11, 1993.
Karol et al., J. Polymer Sci. Chem., vol. 31, p. 2541 (1993).
Wu, et al, J. Am. Chem. Soc. 1995, 117, 5867–5868.
Chem. Abst., 121:135002q (Mar. 1994).

*Primary Examiner*—David W. Wu
*Assistant Examiner*—Ling-Siu Choi
*Attorney, Agent, or Firm*—P. W. Leuzzi

[57] ABSTRACT

The invention relates to a process for the polymerization of olifins in the presence of an activated catalyst composition comprising a single site catalyst precursor and an activating cocatalyst, which comprises contacting outside of a polymerization reactor a single site catalyst precursor with an activating cocatalyst before, during, or after contacting the single site catalyst precursor with a weakly coordinating electron donor that does not substantially polymerize during either contacting.

6 Claims, No Drawings

OLEFIN POLYMERIZATION CATALYST COMPOSITION HAVING INCREASED ACTIVITY

This application is a Division of Ser. No. 08/781,196, Jan. 10, 1997, now U.S. Pat. No. 5,912,202.

The invention relates to a method for preparing an activated olefin polymerization catalyst composition comprising a single site catalyst precursor and an activating cocatalyst, which comprises contacting outside of a polymerization reactor a single site catalyst precursor with an activating cocatalyst before, during, or after contacting the single site catalyst precursor with a weakly coordinating electron donor that does not substantially polymerize during either contacting.

BACKGROUND

A variety of catalyst compositions containing single site catalyst precursors have been shown to be highly useful in the preparation of polyolefins, producing relatively homogeneous copolymers at good polymerization rates and allowing one to tailor closely the final properties of the polymer produced. In contrast to traditional Ziegler-Natta catalyst compositions, single site catalyst compositions comprise catalytic compounds in which each catalyst composition molecule contains one or only a few polymerization sites. Metallocenes are the most well known type of single site catalyst precursor, and are organometallic coordination complexes containing one or more pi-bonded moieties (i.e., cycloalkadienyl groups) in association with a metal atom from Groups IIIB to VIII or the Lanthanide series of the Periodic Table of Elements.

It is known in the art that the presence of olefin comonomers during ethylene copolymerization sometimes increases the activity of the catalyst composition being used. This is often referred to as the "comonomer effect." The comonomer effect has been associated with catalyst composition containing both Ziegler-Natta catalysts and metallocenes. See for example, Karol et al., *J. Polymer Sci. Chem.*, Vol, 31, p. 2541 (1993); Koivumaki et al., *Macromolecules*, Vol. 26, No. 21, p. 5535 (1993); Herfert et al., *Makromol. Chem.*, Vol. 194, p. 3167 (1993), and Tait et al., *Catalyst Design for Tailor-Made Polyolefins*, Eds., Soga and Merano, Kodanska, New York, p.55 (1972).

In addition, it is known that both Ziegler-Natta catalyst compositions and metallocene catalyst compositions may be prepolymerized by an olefin prior to introduction into a polymerization reactor. For example, U.S. Pat. No. 4,767,735 to Ewen et al. discloses the prepolymerization of a Ziegler-type catalyst composition for use in olefin polymerization. Prepolymerization is accomplished by adding an olefin monomer to a fluid carrier stream containing a Ziegler catalystc composition, and then passing the monomer/Ziegler catalyst/carrier stream through an elongated tubular reactor at a flow rate sufficient to provide a residence time in the tubular reactor of less than one minute and under conditions to prepolymerize the catalyst composition.

U.S. Pat. No. 4,665,047 relates to a zirconocene/aluminoxane catalyst composition stabilized against aging prior to use by adding to the catalyst composition during or after its preparation at least one mole of a stabilizing olefin of the formula $R_1R_2R_3CCH_2=CH_2$, wherein $R_1$, $R_2$ and $R_3$ are $C_1-C_{20}$ alkyl moieties, per mole of zirconocene. Similarly, British Patent Application No. 1 300 734 describes a titanium trichloride/aluminum trialkyl catalyst composition stabilized by adding thereto during or after its preparation an olefin.

Although catalyst compositions containing single site catalyst precursors have good activity, it is often desirable to be able to boost their activities even further. To this end, applicants have discovered that when a single site catalyst precursor is contacted outside of the polymerization reactor with an activating cocatalyst before, during, or after contacting the single site catalyst precursor with a weakly coordinating electron donor that does not substantially polymerize during either contacting, an activated catalyst composition is formed that has greatly increased activity relative to a similar activated catalyst composition prepared by contacting the same catalyst precursor and the same activating cocatalyst but without contacting the weakly coordinating electron donor.

SUMMARY OF THE INVENTION

The invention provides a method for preparing an olefin polymerization catalyst composition, which comprises contacting outside of a polymerization reactor a single site catalyst precursor with an activating cocatalyst before, during, or after contacting the single site catalyst precursor with a weakly coordinating electron donor that does not substantially polymerize during either contacting.

The invention also provides a catalyst composition prepared by the above method, as well as a process for the polymerization of olefins, which comprises contacting at least one olefin monomer under polymerization conditions with this catalyst composition.

DETAILED DESCRIPTION OF THE INVENTION

The catalyst composition may be prepared using any metallocene or other single site catalyst precursor. The catalyst composition may contain one or more than one single site catalyst precursor. The single site catalyst precursor may be made by any means available; the method of synthesis of the single site catalyst precursor is not critical to the invention.

As used herein, a single site catalyst precursor is a catalyst precursor that produces, when used with an appropriate activating cocatalyst in gas phase polymerization, a 0.950 density ethylene/1-hexene copolymer having a Crystallizable Chain Length Distribution Index (CCLDI) of less than 12. The Crystallizable Chain Length Distribution Index of a copolymer is determined using Temperature Rising Elution Fractionation (TREF). The analytical TREF method used is similar to that described in Wild et al., *J. Polymer Sci., Poly. Phys. Ed.*, Vol. 20, p. 441 (1982). A dilute solution of the copolymer in a solvent such as 1,2,4-trichlorobenzene, at 1–4 mg/ml, is loaded at high temperature onto a packed column. The column is then allowed to slowly cool down at 0.1° C./min. to ambient temperature in a controlled manner so that the copolymer is crystallized onto the packing in the order of increasing branching (or decreasing crystallinity) with the decreasing temperature. The column is then heated in a controlled manner at 0.7° C./min to above 140° C. with a constant solvent flow at 2 ml/min through the column. The polymer fractions as they are eluted have decreasing branching (or increasing crystallinity) with the increasing temperature. An infrared concentration detector is used to monitor effluent concentrations. From the TREF temperature data, the branch frequency may be obtained for a given comonomer. Consequently, the main chain lengths between branches, expressed as $L_w$ and $L_n$, may be calculated as follows. $L_w$ is the weight average chain length between branches:

$$L_w = \Sigma_i w_i L_i$$

and $L_n$ is the number average chain length between branches:

$$L_n = 1/\Sigma_i(w_i/L_i),$$

wherein $w_i$ is the weight fraction of the copolymer component i having an average backbone chain spacing $L_i$ between two adjacent branch points.

The single site catalyst precursor may be a metallocene, i.e., an organometallic coordination complex of one or more π-bonded moieties (i.e., cycloalkadienyl groups) in association with a metal atom from Groups IIIB to VIII or the Lanthanide series of the Periodic Table of Elements. Bridged and unbridged mono-, di-, and tri-cycloalkadienyl/metal compounds are the most common metallocene catalysts, and generally are of the formula:

$$(L)_y R_z^1 (L')MX_{(x-y-1)} \qquad (I)$$

wherein M is a metal from groups IIIB to VIII or a rare earth metal of the Periodic Table; L and L' are the same or different and are π-bonded ligands coordinated to M, preferably cycloalkadienyl groups such as cyclopentadienyl, indenyl, or fluorenyl groups optionally substituted with one or more hydrocarbyl groups containing 1 to 20 carbon atoms; $R^1$ is selected from the group consisting of $C_1$–$C_4$ substituted or unsubstituted alkylene radicals, dialkyl or diaryl germanium or silicon groups, and alkyl or aryl phosphine or amine radicals bridging L and L'; each X is independently hydrogen, an aryl, alkyl, alkenyl, alkylaryl, or arylalkyl radical having 1–20 carbon atoms, a hydrocarboxy radical having 1–20 carbon atoms; y is 0, 1, or 2; x is 1, 2, 3, or 4 depending upon the valence state of M; z is 0 or 1 and is 0 when y is 0; and x-y≧1.

Illustrative but non-limiting examples of metallocenes represented by formula I are dialkyl metallocenes such as bis(cyclopentadienyl)titanium dimethyl, bis(cyclopentadienyl)titanium diphenyl, bis(cyclopentadienyl)zirconium dimethyl, bis(cyclopentadienyl)zirconium diphenyl, bis(cyclopentadienyl)hafnium methyl and diphenyl, bis(cyclopentadienyl)titanium di-neopentyl, bis(cyclopentadienyl)zirconium di-neopentyl, bis(cyclopentadienyl)titanium dibenzyl, bis(cyclopentadienyl)zirconium dibenzyl, bis(cyclopentadienyl)vanadium dimethyl; the mono alkyl metallocenes such as bis(cyclopentadienyl)titanium methyl chloride, bis(cyclopentadienyl)titanium ethyl chloride, bis(cyclopentadienyl)titanium phenyl chloride, bis(cyclopentadienyl)zirconium methyl chloride, bis(cyclopentadienyl)zirconium ethyl chloride, bis(cyclopentadienyl)zirconium phenyl chloride, bis(cyclopentadienyl)titanium methyl bromide; the trialkyl metallocenes such as cyclopentadienyl titanium trimethyl, cyclopentadienyl zirconium triphenyl, and cyclopentadienyl zirconium trineopentyl, cyclopentadienyl zirconium trimethyl, cyclopentadienyl hafnium triphenyl, cyclopentadienyl hafnium trineopentyl, and cyclopentadienyl hafnium trimethyl; monocyclopentadienyl titanocenes such as pentamethylcyclopentadienyl titanium trichloride, pentaethylcyclopentadienyl titanium trichloride, bis(pentamethylcyclopentadienyl)titanium diphenyl; the carbene represented by the formula bis(cyclopentadienyl)titanium=CH2 and derivatives of this reagent; substituted bis(cyclopentadienyl)titanium (IV) compounds such as bis(indenyl)titanium diphenyl or dichloride, bis(methylcyclopentadienyl)titanium diphenyl or dihalides; dialkyl, trialkyl, tetraalkyl and pentaalkyl cyclopentadienyl titanium compounds such as bis(1,2-dimethylcyclopentadienyl)titanium diphenyl or (dichloride, bis(1,2-diethylcyclopentadienyl)titanium diphenyl or dichloride; silicon, phosphine, amine or carbon bridged cyclopentadiene complexes such as dimethyl silyldicyclopentadienyl titanium diphenyl or dichloride, methyl phosphine dicyclopentadienyl titanium diphenyl or dichloride, methylenedicyclopentadienyl titanium diphenyl or dichloride and other dihalide complexes, and the like, as well as isopropyl(cyclopentadienyl)(fluorenyl)zirconium dichloride, isopropyl(cyclopentadienyl)(octahydrofluorenyl)zirconium dichloride, diphenylmethylene(cyclopentadienyl)(fluorenyl)zirconium dichloride, diisopropylmethylene (cyclopentadienyl)(fluorenyl)zirconium dichloride, diisobutylmethylene (cyclopentadienyl)(fluorenyl)zirconium dichloride, ditertbutylmethylene (cyclopentadienyl)(fluorenyl)zirconium dichloride, cyclohexylidene(cyclopentadienyl)(fluorenyl) zirconium dichloride, diisopropylmethylene (2,5-dimethylcyclopentadienyl)(fluorenyl)-zirconium dichloride, isopropyl(cyclopentadienyl)(fluorenyl)-hafnium dichloride, diphenylmethylene (cyclopentadienyl)-(fluorenyl)hafnium dichloride, diisopropylmethylene-(cyclopentadienyl)(fluorenyl)hafnium dichloride, diisobutylmethylene (cyclopentadienyl)(fluorenyl)hafnium dichloride, ditertbutylmethylene(cyclopentadienyl)-(fluorenyl)hafnium dichloride, cyclohexylidene(cyclopentadienyl)(fluorenyl) hafnium dichloride, dilsopropylmethylene(2,5-dimethylcyclopentadienyl)(fluorenyl)hafnium dichloride, isopropyl(cyclopentadienyl)(fluorenyl)titanium dichloride, diphenylmethylene(cyclopentadienyl)(fluorenyl)titanium dichloride, diisopropylmethylene(cyclopentadienyl)-(fluorenyl)titanium dichloride, diisobutylmethylene-(cyclopentadienyl)(fluorenyl)titanium dichloride, ditertbutylmethylene(cyclopentadienyl)(fluorenyl)titanium dichloride, cyclohexylidene(cyclopentadienyl)(fluorenyl) titanium dichloride, diisopropylmethylene(2,5 dimethylcyclopentadienyl)-(fluorenyl)titanium dichloride, racemic-ethylene bis (1-indenyl) zirconium (IV) dichloride, racemic-ethylene bis (4,5,6,7-tetrahydro-1-indenyl) zirconium (IV) dichloride, racemic-dimethylsilyl bis (1-indenyl) zirconium (IV) dichloride, racemic-dimethylsilyl bis (4,5,6,7-tetrahydro-1-indenyl) zirconium (IV) dichloride, racemic-1,1,2,2-tetramethylsilanylene bis (1-indenyl) zirconium (IV) dichloride, racemic-1,1,2,2-tetramethylsilanylene bis (4,5,6,7-tetrahydro-1-indenyl) zirconium (IV), dichloride, ethylidene (1-indenyl tetramethylcyclopentadienyl) zirconium (IV) dichloride, racemic-dimethylsilyl bis (2-methyl-4-t-butyl-1-cyclopentadienyl) zirconium (IV) dichloride, racemic-ethylene bis (1-indenyl) hafnium (IV) dichloride, racemic-ethylene bis (4,5,6,7-tetrahydro-1-indenyl) hafnium (IV) dichloride, racemic-dimethylsilyl bis (1-indenyl) hafnium (IV) dichloride, racemic-dimethylsilyl bis (4,5,6,7-tetrahydro-1- indenyl) hafnium (IV) dichloride, racemic-1,1,2,2- tetramethylsilanylene bis (1-indenyl) hafnium (IV) dichloride, racemic-1,1,2,2-tetramethylsilanylene bis (4,5,6,7-tetrahydro-1-indenyl) hafnium (IV), dichloride, ethylidene (1-indenyl-2,3,4,5-tetramethyl-1-cyclopentadienyl) hafnium (IV) dichloride, racemic- ethylene bis (1-indenyl) titanium (IV) dichloride, racemic-ethylene bis (4,5,6,7-tetrahydro-1-indenyl) titanium (IV) dichloride, racemic- dimethylsilyl bis (1-indenyl) titanium (IV) dichloride, racemic- dimethylsilyl bis (4,5,6, 7-tetrahydro-1-indenyl) titanium (IV) dichloride, racemic-1,1,2,2-tetramethylsilanylene bis (1-indenyl) titanium (IV) dichloride racemic-1,1,2,2-tetramethylsilanylene bis (4,5,6,7-tetrahydro-1-indenyl) titanium (IV) dichloride, and ethylidene (1-indenyl-2,3,4,5-tetramethyl-1-cyclopentadienyl) titanium IV) dichloride.

A preferred type of single site catalyst precursor for use in the invention is a complex of a transition metal, a substituted or unsubstituted pi-bonded ligand, and one or more heteroallyl moieties, such as those described in U.S. Pat. No. 5,527,752. Preferably, such complexes have one of the following formulas:

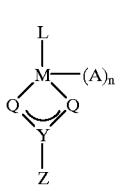
(II)

wherein:
M is a transition metal, preferably Zr or Hf;
L is a substituted or unsubstituted, pi-bonded ligand coordinated to M, preferably a cycloalkadienyl ligand;
each Q is independently selected from the group consisting of —O—, —NR—, —CR$_2$— and —S—, preferably oxygen;
Y is either C or S, preferably carbon;
Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$ and —H, preferably Z is selected from the group consisting of —OR, —CR$_3$ and —NR$_2$;
n is 1 or 2;
A is a univalent anionic group when n is 2 or A is a divalent anionic group when n is 1, preferably A is a carbamate, carboxylate, or other heteroallyl moiety described by the Q, Y and Z combination; and
each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent;

or

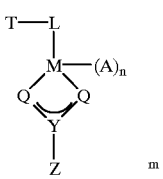
(III)

wherein:
M is a transition metal, preferably Zr or Hf;
L is a substituted or unsubstituted, pi-bonded ligand coordinated to M, preferably a cycloalkadienyl ligand;
each Q is independently selected from the group consisting of —O—, —NR—, —CR$_2$— and —S—, preferably oxygen;
Y is either C or S, preferably carbon;
Z is selected from the group consisting of —OR, —NR$_2$, —CR$_3$, —SR, —SiR$_3$, —PR$_2$, —H, and substituted or unsubstituted aryl groups, with the proviso that when Q is —NR— then Z is selected from the group consisting of —OR, —NR$_2$, —SR, —SiR$_3$, —PR$_2$, —H, and substituted or unsubstituted aryl groups, preferably Z is selected from the group consisting of —OR, —CR$_3$ and —NR$_2$;
n is 1 or 2;
A is a univalent anionic group when n is 2 or A is a divalent anionic group when n is 1, preferably A is a carbamate, carboxylate, or other heteroallyl moiety described by the Q, Y and Z combination;
each R is independently a group containing carbon, silicon, nitrogen, oxygen, and/or phosphorus where one or more R groups may be attached to the L substituent, preferably R is a hydrocarbon group containing from 1 to 20 carbon atoms, most preferably an alkyl, cycloalkyl, or an aryl group and one or more may be attached to the L substituent;
T is a bridging group selected from the group consisting of alkylene and arylene groups containing from 1 to 10 carbon atoms optionally substituted with carbon or heteroatoms, germanium, silicone and alkyl phosphine; and
m is 2 to 7, preferably 2 to 6, most preferably 2 or 3.

In formulas II and III, the supportive substituent formed by Q, Y and Z is a uncharged polydentate ligand exerting electronic effects due to its high polarizability, similar to the cyclopentadienyl group. In the most preferred embodiments of this invention, the disubstituted carbamates,

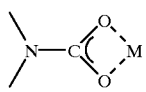

and the carboxylates

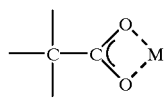

are employed.

Examples of complexes according to formulas I and II include indenyl zirconium tris(diethylcarbamate), indenyl zirconium tris(trimethylacetate), indenyl zirconium tris(p-toluate), indenyl zirconium tris(benzoate), (1-methylindenyl)zirconium tris(trimethylacetate), (2-methylindenyl) zirconium tris(diethylcarbamate), (methylcyclopentadienyl) zirconium tris(trimethylacetate), cyclopentadienyl tris(trimethylacetate), tetrahydroindenyl zirconium tris(trimethylacetate), and (pentamethylcyclopentadienyl) zirconium tris(benzoate). Preferred examples are indenyl zirconium tris (diethylcarbamate), indenyl zirconium tris (trimethylacetate), and (methylcyclopentadienyl) zirconium tris(trimethylacetate).

One method of manufacturing a preferred catalyst precursor, indenyl zirconium tris(diethylcarbamate), is to first react a source of cycloalkadienyl ligand with a metal compound of the formula M(NR$_2$)$_4$, in which M and R are defined above, to introduce the cycloalkadienyl ligand onto the metal compound. The resulting product is then dissolved in an inert solvent, such as toluene, and the heterocumulene $CO_2$ is contacted with the dissolved product to insert into one or more $M\text{-}NR_2$ bonds to form a carbamate.

Another type of single site catalyst precursor that can be used in accordance with the invention is a constrained geometry catalyst of the formula:

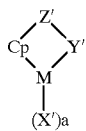

(IV)

wherein:

M is a metal of groups IIIB to VIII of the Periodic Table;

Cp is a cyclopentadienyl or substituted cyclopentadienyl group bound in an $\eta^5$ mode to M;

Z' is a moiety comprising boron, or a member of group IVB of the Periodic Table and optionally sulfur or oxygen, the moiety having up to 20 non-hydrogen atoms, and optionally Cp and Z' together form a fused ring system;

X' is an anionic ligand group or a neutral Lewis base ligand group having up to 30 non-hydrogen atoms;

a is 0, 1, 2, 3 or 4 depending on the valence of M; and

Y' is an anionic or non-anionic ligand group bonded to Z' and M and is nitrogen, phosphorus, oxygen or sulfur having up to 20 non-hydrogen atoms, and optionally Y' and Z' together form a fused ring system.

Constrained geometry catalysts are well known to those skilled in the art and are disclosed in, for example, U.S. Pat. Nos. 5,026,798 and 5,055,438 and published European Application No. 0 416 815 A2.

Illustrative but non-limiting examples of substituents Z', Cp, Y', X' and M in formula IV are:

| Z' | Cp | Y' | X' | M |
|---|---|---|---|---|
| dimethyl-Silyl | cyclopentadienyl | t-butylamido | chloride | titanium |
| methyl-phenylsilyl | fluorenyl | phenylamido | methyl | zirconium |
| diphenyl-silyl | indenyl | cyclohexylamido | | hafnium |
| tetramethyl-ethylene | | oxo | | |
| ethylene | tetramethyl-cyclopentadienyl | | | |
| diphenyl-methylene | | | | |

The invention is also useful with another class of single site catalyst precursors, di(imine) metal complexes, as described in PCT Application No. WO 96/23010. Such di(imine) metal complexes are transition metal complexes of bidentate ligands selected from the group consisting of:

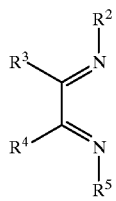

(V)

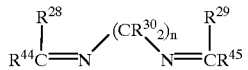

(VI)

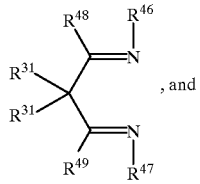

, and (VII)

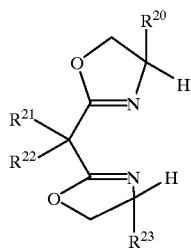

(VIII)

wherein said transition metal is selected from the group consisting of Ti, Zr, Sc, V, Cr, a rare earth metal, Fe, Co, Ni, and Pd;

$R^2$ and $R^5$ are each independently hydrocarbyl or substituted hydrocarbyl, provided that the carbon atom bound to the imino nitrogen atom has at least two carbon atoms bound to it;

$R^3$ and $R^4$ are each independently hydrogen, hydrocarbyl, substituted hydrocarbyl, or $R^3$ and $R^4$ taken together are hydrocarbylene or substituted hydrocarbylene to form a carbocyclic ring;

$R^{44}$ is hydrocarbyl or substituted hydrocarbyl, and $R^{28}$ is hydrogen, hydrocarbyl or substituted hydrocarbyl or $R^{44}$ and $R^{28}$ taken together form a ring;

$R^{45}$ is hydrocarbyl or substituted hydrocarbyl, and $R^{29}$ is hydrogen, substituted hydrocarbyl or hydrocarbyl, or $R^{45}$ and $R^{29}$ taken together form a ring;

each $R^{30}$ is independently hydrogen, substituted hydrocarbyl or hydrocarbyl, or two of $R^{30}$ taken together form a ring;

each $R^{31}$ is independently hydrogen, hydrocarbyl or substituted hydrocarbyl;

$R^{46}$ and $R^{47}$ are each independently hydrocarbyl or substituted hydrocarbyl, provided that the carbon atom bound to the imino nitrogen atom has at least two carbon atoms bound to it;

$R^{48}$ and $R^{49}$ are each independently hydrogen, hydrocarbyl, or substituted hydrocarbyl;

$R^{20}$ and $R^{23}$ are independently hydrocarbyl or substituted hydrocarbyl;

$R^{21}$ and $R^{22}$ are independently hydrogen, hydrocarbyl or substituted hydrocarbyl; and n is 2 or 3;
and provided that:
said transition metal also has bonded to it a ligand that may be displaced by or added to the olefin monomer being polymerized; and
when the transition metal is Pd, said bidentate ligand is (V), (VII) or (VIII).

The activated cocatalyst is capable of activating the single site catalyst precursor. Preferably, the activating cocatalyst is one of the following: (a) branched or cyclic oligomeric poly(hydrocarbylaluminum oxide)s which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group; (b) ionic salts of the general formula [A$^+$][BR$_4^-$], where A$^+$ is a cationic Lewis or Bronsted acid capable of abstracting an alkyl, halogen, or hydrogen from the metallocene catalysts, B is boron, and R is a substituted aromatic hydrocarbon, preferably a perfluorophenyl radical; (c) boron alkyls of the general formula BR$_3$, where R is as defined above; or mixtures thereof. Ionic salts of the general formula [A$^+$] [BR**$_4^-$] and boron alkyls can optionally be used with alkylating agents such as alkyl aluminum and alkyl lithium compounds.

Preferably, the activating cocatalyst is a branched or cyclic oligomeric poly(hydrocarbylaluminum oxide) or a boron alkyl. More preferably, the activating cocatalyst is an aluminoxane such as methylaluminoxane (MAO) or modified methylaluminoxane (MMAO), or a boron alkyl.

Aluminoxanes are well known in the art and comprise oligomeric linear alkyl aluminoxanes represented by the formula:

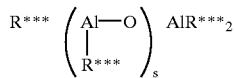

and oligomeric cyclic alkyl aluminoxanes of the formula:

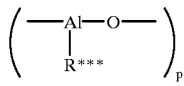

wherein s is 1–40, preferably 10–20; p is 3–40, preferably 3–20; and R*** is an alkyl group containing 1 to 12 carbon atoms, preferably methyl or an aryl radical such as a substituted or unsubstituted phenyl or naphthyl radical. Aluminoxanes may be prepared in a variety of ways well known in the art.

The mole ratio of single site catalyst precursor to activating cocatalyst usefully employed in the catalyst composition may vary. When the activating cocatalyst is a branched or cyclic oligomeric poly(hydrocarbylaluminum oxide), the mole ratio of aluminum atoms contained in the poly (hydrocarbylaluminum oxide) to total metal atoms contained in the single site catalyst precursor is generally in the range of from about 2:1 to about 100,000:1, preferably in the range of from about 10:1 to about 10,000:1, and most preferably in the range of from about 50:1 to about 2,000:1. When the activating cocatalyst is an ionic salt of the formula [A$^+$][BR$_4^-$] or a boron alkyl of the formula BR$_3$, the mole ratio of boron atoms contained in the ionic salt or the boron alkyl to total metal atoms contained in the single site catalyst precursor is generally in the range of from about 0.5:1 to about 10:1, preferably in the range of from about 1:1 to about 5:1.

Contacting of the single site catalyst precursor with the activating cocatalyst typically takes place from about 0.01 to about 1000 minutes, preferably about 0.1 to about 100 minutes, more preferably about 1 to about 50 minutes, at temperatures of about −20 to about 80° C., preferably about 0 to about 60° C., and pressures of up to about 300 psi, preferably up to about 20 psi.

Either before, during, or after the single site catalyst precursor is contacted with the activating cocatalyst, the single site catalyst precursor is contacted with a weakly coordinating electron donor that does not substantially polymerize during either contacting. Preferably, the single site catalyst precursor is contacted with the electron donor before the single site catalyst precursor is contacted with the activating cocatalyst. Contacting of the single site catalyst precursor with the electron donor ensures that the activated catalyst composition will demonstrate increased activity according to the invention. An activated catalyst composition comprising a single site catalyst precursor and an activating cocatalyst made according to the invention demonstrates an activity for the polymerization of olefins that is generally at least 10% greater than, preferably at least 100% greater than, the activity of a similar activated catalyst composition prepared by contacting the same single site catalyst precursor with the same activating cocatalyst but without the use of any electron donor.

It has also been discovered that when a catalyst composition made according to the invention is used in gas phase polymerization, it often produces polymer resin having a more stable average particle size (APS). Polymer produced in gas phase polymerization using the present catalyst composition is less likely to agglomerate, allowing one to more closely control the APS of the polymer produced.

Contacting of the single site catalyst composition with the electron donor typically takes place from about 0.01 to about 1000 minutes, preferably about 0.1 to about 100 minutes, more preferably about 1 to about 50 minutes, at temperatures of about −20 to about 80° C., preferably about 0 to about 60° C., and pressures of up to about 300 psi, preferably up to about 20 psi.

Weakly coordinating electron donors are those capable of weakly binding to the metal atom in the single site catalyst precursor but readily displaced under the conditions of the olefin polymerization reaction. It is important that the weakly coordinating electron donor not substantially polymerize under the conditions of contacting with the single site catalyst precursor and/or the activating cocatalyst. Preferably, the electron donor does not polymerize at all during either contacting. Examples of weakly coordinating electron donors are olefins and diolefins, such as 1,1-disubstituted olefins and alpha-olefins, including 1-hexene, butene, and isobutylene; amines such as tertiary amines including pyridines; ethers, especially hindered ethers such as methyl t-butyl ether; and phosphines such as trimethylphosphine. Preferably, the electron donor is an olefin, most preferably, the electron donor is selected from the group consisting of 1-hexene, butene and isobutylene.

The amount of electron donor required varies with the specific single site catalyst precursor and cocatalyst used. Typically, the mole ratio of electron donor to single site catalyst precursor is from about 1:10 to 10,000:1, preferably from about 1:2 to 5000:1, most preferably from about 1:1 to 1000:1. The electron donor may be neat or dissolved in an appropriate solvent such as isopentane, hexane, toluene, or the like.

In a preferred embodiment of the invention, the single site catalyst precursor is contacted with the electron donor before the single site catalyst precursor is contacted with the activating cocatalyst, and in addition, the activity of the activated catalyst composition is further controlled by adjusting the contact time between the catalyst precursor/electron donor mixture and the activating cocatalyst. Specifically, the activity of the activated catalyst composition may be further increased by changing the contact time between the catalyst precursor/electron donor mixture and the activating cocatalyst. Preferably, a change in contact time between the catalyst precursor/electron donor mixture and activating cocatalyst of about 50% results in an additional 50% increase in the activity of the activated catalyst composition.

The catalyst composition can be supported or in unsupported, liquid form such as a solution or dispersion, or spray dried. In the case of a supported catalyst composition, typical supports include, for example, silica, carbon black, polyethylene, polycarbonate porous crosslinked polystyrene, porous crosslinked polypropylene, alumina, thoria, zirconia, and magnesium halide (e.g., magnesium dichloride) as well as other well known support materials and mixtures thereof.

Particularly preferred however is a catalyst composition that is spray dried or in unsupported, liquid form. For example, the catalyst composition may be introduced into the reaction zone in unsupported, liquid form as described in U.S. Pat. No. 5,317,036. As used herein, "unsupported, liquid form" includes liquid catalyst precursor, liquid electron donor, liquid cocatalyst, solution(s) or dispersions thereof in the same or different solvent(s), and combinations thereof. Unsupported, liquid form catalyst compositions have a number of practical benefits. Unsupported catalyst compositions avoid the costs associated with support material and its preparation, and provide for the realization of a very high catalyst surface area to volume ratio. Furthermore, unsupported catalyst compositions produce polymers having a much lower residual ash content than polymers produced using supported catalyst compositions.

Once activated, the catalyst composition may be used for the polymerization of olefins by any suspension, solution, slurry, or gas phase process, using known equipment and reaction conditions, and is not limited to any specific type of reaction system. Generally, olefin polymerization temperatures range from about 0° C. to about 200° C. at atmospheric, subatmospheric, or superatmospheric pressures. Slurry or solution polymerization processes may utilize subatmospheric or superatmospheric pressures and temperatures in the range of about 40° C. to about 110° C. A useful liquid phase polymerization reaction system is described in U.S. Pat. No. 3,324,095. Liquid phase reaction systems generally comprise a reactor vessel to which olefin monomer and catalyst composition are added, and which contains a liquid reaction medium for dissolving or suspending the polyolefin. The liquid reaction medium may consist of the bulk liquid monomer or an inert liquid hydrocarbon that is nonreactive under the polymerization conditions employed. Although such an inert liquid hydrocarbon need not function as a solvent for the catalyst composition or the polymer obtained by the process, it usually serves as solvent for the monomers employed in the polymerization. Among the inert liquid hydrocarbons suitable for this purpose are isopentane, hexane, cyclohexane, heptane, benzene, toluene, and the like. Reactive contact between the olefin monomer and the catalyst composition should be maintained by constant stirring or agitation. The reaction medium containing the olefin polymer product and unreacted olefin monomer is withdrawn from the reactor continuously. The olefin polymer product is separated, and the unreacted olefin monomer and liquid reaction medium are recycled into the reactor.

Preferably, gas phase polymerization is employed, with superatmospheric pressures in the range of 1 to 1000 psi, preferably 50 to 400 psi, most preferably 100 to 300 psi, and temperatures in the range of 30 to 130° C., preferably 65 to 110° C. Stirred or fluidized bed gas phase reaction systems are particularly useful. Generally, a conventional gas phase, fluidized bed process is conducted by passing a stream containing one or more olefin monomers continuously through a fluidized bed reactor under reaction conditions and in the presence of the catalyst composition at a velocity sufficient to maintain a bed of solid particles in a suspended condition. A stream containing unreacted monomer is withdrawn from the reactor continuously, compressed, cooled, optionally fully or partially condensed as disclosed in U.S. Pat. Nos. 4,528,790 and 5,462,999, and recycled to the reactor. Product is withdrawn from the reactor and make-up monomer is added to the recycle stream. As desired for temperature control of the system, any gas inert to the catalyst composition and reactants may also be present in the gas stream. In addition, a fluidization aid such as carbon black, silica, clay, or talc may be used, as disclosed in U.S. Pat. No. 4,994,534.

Polymerization may be carried out in a single reactor or in two or more reactors in series, and is conducted substantially in the absence of catalyst poisons. Organometallic compounds may be employed as scavenging agents for poisons to increase the catalyst activity. Examples of scavenging agents are metal alkyls, preferably aluminum alkyls, most preferably triusobutylaluminum.

Conventional adjuvants may be included in the process, provided they do not interfere with the operation of the catalyst composition in forming the desired polyolefin. Hydrogen or a metal or non-metal hydride, e.g., a silyl hydride, may be used as a chain transfer agent in the process. Hydrogen may be used in amounts up to about 10 moles of hydrogen per mole of total monomer feed.

Polyolefins that may be produced according to the invention include, but are not limited to, those made from olefin monomers such as ethylene and linear or branched higher alpha-olefin monomers containing 3 to about 20 carbon atoms. Homopolymers or interpolymers of ethylene and such higher alpha-olefin monomers, with densities ranging from about 0.86 to about 0.95 may be made. Suitable higher alpha-olefin monomers include, for example, propylene, 1-butene, 1-pentene, 1-1-hexene, 4-methyl-1-pentene, 1-octene, and 3,5,5-trimethyl-1-1-hexene. Olefin polymers according to the invention may also be based on or contain conjugated or non-conjugated dienes, such as linear, branched, or cyclic hydrocarbon dienes having from about 4 to about 20, preferably 4 to 12, carbon atoms. Preferred dienes include 1,4-pentadiene, 1,5-hexadiene, 5-vinyl-2-norbornene, 1,7-octadiene, vinyl cyclol-hexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific polyolefins that may be made according to the invention include, for example, polyethylene, polypropylene, ethylene/propylene rubbers (EPR's), ethylene/propylene/diene terpolymers (EPDM's), polybutadiene, polyisoprene and the like.

The following examples further illustrate the invention.

EXAMPLES 1–20

A series of ethylene/1-hexene copolymers were made in a slurry phase, laboratory scale reactor. The catalyst composition used in Examples 1–18 was unsupported IndZr(O$_2$CNEt$_2$)$_3$/modified methylaluminoxane (MMAO). The IndZr(O$_2$CNEt$_2$)$_3$ catalyst precursor was made according to the general method described in U.S. Pat. No. 5,527,752, and the MMAO was type 3A, 7.2 weight percent Al, commercially available from Akzo Chemicals, Inc. The catalyst composition used in Examples 19 and 20 was unsupported IndZr[O$_2$CC(CH$_3$)$_3$]$_3$/MMAO. As indicated in Table 1, in half of the Examples the catalyst precursor was contacted with an olefin before it was contacted with MMAO, while in the other half of the Examples, the catalyst precursor and MMAO were simply contacted. The results are shown in Table 1 below.

In each example, the reactor was first dried by heating to 100° C. while purging with 500 sccm of nitrogen for 30 minutes. Ethylene was pre-fed at 3000 sccm for one minute with stirring, then heated to reaction temperature. Ethylene was initially fed into the reactor at 40 psi higher than the reaction pressure. The reactor was heated to a pre-heat temperature (usually 55° C.) and half of the MMAO charge was added to the reactor as a co-catalyst/scavenger.

In Examples 2, 4, 6, 8, 10, 12, 14, 16, 18, and 20, 0.25 mL of 50 mM IndZr(O$_2$CNEt$_2$)$_3$ or IndZr[O$_2$CC(CH$_3$)$_3$]$_3$ was diluted with 3 mL of dry toluene and then 3 mL of 1-hexene in a glove box to form a light amber stock solution (2 mM). To 1 mL of the above stock solution (2 μmol Zr) was added 0.56 mL of MMAO (0.5 mmol, 500 eq., 1.78 M). The bright yellow solution was injected via a syringe into the reactor containing 600 mL of hexane, 43 mL of 1-hexene, and 0.56 mL of MMAO within 45 minutes of the MMAO addition.

In Examples 1, 3, 5, 7, 9, 11, 13, 15, 17, and 19, 0.25 mL of 50 mM IndZr(O$_2$CNEt$_2$)$_3$ or IndZr[O$_2$CC(CH$_3$)$_3$]$_3$ was diluted with 6 mL of dry toluene in a glove box to form a light amber stock solution (2 mM). To 1 mL of the above stock solution (2 μmol Zr) was added 0.56 mL of MMAO (0.5 mmol, 500 eq., 1.78 M). The dark amber solution was injected into the reactor containing 600 mL of hexane, 43 mL of 1-hexene, and 0.56 mL of MMAO within 30 minutes of mixing the MMAO and zirconium.

In each case, polymerization was conducted at 75° C. under 85 psi ethylene for 30 minutes. A computer maintained the selected pressure and temperature for the duration of the run. At the end of the reaction, the computer cooled, depressurized and purged the system with nitrogen. The recovered polymers were treated with BHT in methanol (25 mg/5 mL), vacuum filtered through #4 paper and dried in a vacuum oven at 55° C. The dry resins were treated with 1000 ppm of B900 blended antioxidant stabilizer (1 pt. IRGANOX 1076 & 4 pts. IRGAFOS 168) and pulverized in a Waring blender before analysis.

TABLE 1

| Example | Electron Donor (a) | [Zr] during activation w/ MMAO | g PE/ mmol M/ 100 psi/ hr | MI | FI | FI/MI | BBF (IR) |
|---|---|---|---|---|---|---|---|
| 1* | none | 1.28 | 14471 | 0.11 | 1.85 | 17.48 | 11.8 |
| 2 | 1-hexene | 1.28 | 63412 | 0.28 | 4.65 | 16.74 | 10.7 |
| 3* | none | 1.28 | 20353 | 0.10 | 1.85 | 17.67 | 9.8 |
| 4 | TMP (b) | 1.28 | 102000 | 3.70 | 74.35 | 20.10 | 13.2 |
| 5* | none | 1.28 | 14000 | 0.14 | 2.42 | 17.23 | |
| 6 | 1-hexene | 1.28 | 91529 | 1.94 | 36.89 | 19.02 | |
| 7* | none | 1.28 | 21647 | 0.19 | 1.83 | 9.66 | 12.2 |
| 8 | 1-hexene | 1.28 | 68471 | 0.14 | 2.37 | 17.01 | 13.3 |
| 9* | none | 1.28 | 11294 | | | | 11.7 |
| 10 | 1-hexene | 1.28 | 24471 | 0.15 | 2.97 | 19.75 | 10.6 |
| 11* | none | 1.28 | 42353 | 0.21 | 3.91 | 18.68 | 10.5 |
| 12 | 1-hexene | 1.28 | 59294 | | | | |
| 13* | none | 1.28 | 18118 | 0.07 | 1.47 | 22.08 | 6.1 |
| 14 | 1-hexene | 1.28 | 50118 | 0.27 | 7.00 | 25.85 | 17.0 |
| 15* | none | 0.75 | 8000 | | | | 4.79 |
| 16 | 1-hexene | 0.75 | 15976 | 0.0503 | 0.982 | 19.646 | 6.02 |
| 17* | none | 0.75 | 31294 | 0.100 | 1.93 | 19.3 | 8.45 |
| 18 | 1-hexene | 0.75 | 68235 | 0.300 | 5.11 | 17.033 | 10.33 |
| 19* | none | 0.75 | 6118 | | | | 7.41 |
| 20 | 1-hexene | 0.75 | 63059 | 0.170 | 3.2 | 18.824 | 9.26 |

(a) Olefin added at 0.25 mL/umol Zr.
(b) 2,4,4-trimethyl-1-pentene.
*comparative.

EXAMPLES 21–24

A series of ethylene/1-hexene copolymers were produced in a horizontally oriented, stirred, gas phase reactor having impeller blades attached to a central shaft. In each of these examples, a pre-bed of 35 g of DAVISON 955–600 silica (calcined at 600° C. under a nitrogen purge) was charged to the reactor, and tri-iso-butyl aluminum was then added to further passivate the pre-bed. The standard conditions for each run were: 5 μmoles Zr; Al/Zr mole ratio=1,000; C6/C2~0.02, 85° C., 130 psi total, 2 hour run.

The catalyst composition in each example was unsupported IndZr($O_2CNEt_2$)$_3$/MMAO. The catalyst precursor was made according to the general method described in U.S. Pat. No. 5,527,752, and the MMAO was type 3A, 7.2 weight percent Al, commercially available from Akzo Chemicals, Inc. To make the catalyst compositions, IndZr($O_2CNEt_2$)$_3$ catalyst (in toluene) was mixed with MMAO (in heptane) in the inert atmosphere glovebox. In Examples 23 and 24, 1-hexene was added after the catalyst and cocatalyst had mixed for five minutes, while in comparative Examples 21 and 22, the catalyst composition was not mixed in the presence of 1-hexene.

TABLE 2

| Example | Electron Donor | Co-catalyst | Yield (grams) | Activity (gPE/mmolM/ 100 psi/hr) |
|---|---|---|---|---|
| 21* | none | MMAO | 122.4 | 9,400 |
| 22* | none | MMAO | 47.0 | 3,700 |
| 23 | 1-hexene | MMAO | 528.8 | 40,700 |
| 24 | 1-hexene | MMAO | 433.2 | 33,000 |

*comparative.

EXAMPLE 25 (Comparative)

IndZr[$O_2CC(CH_3)$]$_3$/MMAO was used as the catalyst composition to polymerize an ethylene/1-hexene copolymer (density 0.917, melt index 3) in a commercial-scale, fluidized bed, gas phase reactor. The reactor was nominally 8 feet in diameter and was operated with a bed height of 38 feet and a superficial gas velocity of approximately 2 ft/sec. Total reactor pressure was 270 psig. A seed bed was charged to the reactor and it was dried to 9 ppm water. The reactor was pressurized to 100 psig of nitrogen and then 50 lbs/hr of 10% TEAL in isopentane were fed to the reactor over one hour and allowed to circulate for one hour. The 1-hexene/ethylene mole ratio was established at 0.028 and the temperature was adjusted. ATMER-163, commercially available from ICI, was added as necessary to the reactor to control the buildup of electrostatic charge.

The catalyst composition was made by mixing IndZr[$O_2CC(CH_3)$]$_3$ with MMAO (type 3A, 7.1 wt % Al, commercially available from Akzo Chemicals, Inc. The catalyst precursor was made according to the general method described in U.S. Pat. No. 5,527,752. Additional dilution of the catalyst composition was performed by adding isopentane to the mixture. The catalyst composition in liquid form was sprayed into the reactor with the aid of a stream of 2600 lbs/hr of ethylene monomer at a temperature between 85 and 90° C. along with 50,000 lbs/hr of recycle gas.

The reactor was started up as described above and then operated at Condition 1a shown in Table 3 below. The catalyst and cocatalyst feed rates were adjusted to provide the desired production rate. Next the 1-hexene/ethylene mole ratio in the reactor was increased to Condition 1b, and the production rate decreased slightly, but did not increase as expected for a comonomer effect.

TABLE 3

|  | Condition 1a | Condition 1b |
|---|---|---|
| Temperature | 76° C. | 76° C. |
| Ethylene Partial Pressure (psia) | 220 | 220 |
| Bed Weight (lbs) | 31,000 | 31,000 |
| Production Rate (lbs/hr) | 5860 | 5790 |
| 1-Hexene to Ethylene Ratio (molar) | 0.025 | 0.027 |

This example illustrates that a preferred catalyst precursor of the invention, IndZr[$O_2CC(CH_3)$]$_3$, does not demonstrate the "comonomer effect."

EXAMPLE 26

Two ethylene/1-hexene copolymers were made in the same manner as described in Example 25, using one of the following catalyst compositions:

Catalyst Composition A: a) a solution of 2 wt % IndZr($O_2CC(CH_3)$)$_3$ and 98 wt % hexane, and b) MMAO (type 3A, 7.1 wt % Al, commercially available from Akzo Chemicals, Inc.

Catalyst Composition B: a) a solution of 1.33 wt % IndZr($O_2CC(CH_3)$)$_3$, 32.9 wt % 1-hexene, and 65.8 wt % hexane, and b) MMAO The catalyst precursor was made according to the general method described in U.S. Pat. No. 5,527,752. The results are shown in Table 4 below:

TABLE 4

|  | Condition 2a | Condition 2b |
|---|---|---|
| Contact Time Between Catalyst Precursor/1-Hexene Reaction Product and MMAO | 14 seconds | 18 seconds |
| Catalyst Composition | A | B |
| Production Rate (lbs/hr) | 6000 | 5350 |
| Residual Zirconium (ppm) | 0.78 | 0.64 |
| Relative Catalyst activity | 1 | 1.25 |

The catalyst feed rates were adjusted to provide comparable production rates. Catalyst Composition B, made by precontacting IndZr($O_2CC(CH_3)$)$_3$ with 1-hexene before contacting with MMAO, was found to be more active than Catalyst Composition A, as evidenced by a lower residual zirconium level in the resin.

What is claimed is:

1. A process for the polymerization of olefins, which comprises contacting at least one olefin monomer under polymerization conditions with an activated catalyst composition prepared by contacting outside of a polymerization reactor a single site catalyst precursor selected from the croup consisting of a) metallocenes, b) complexes of transition metals, cycloalkadienyl ligands and one or more heteroallyl moieties, c) constrained geometry catalysts, and d) di(imine) metal complexes with an activating cocatalyst before, during, or after contacting the single site catalyst precursor with 1-hexene that does not polymerize during either contacting, wherein the activity of the activated catalyst composition is at least 10 percent greater than the activity of a second activated catalyst-composition prepared by contacting the same single site catalyst precursor with the same activating cocatalyst but without contacting the 1-hexene.

2. The process of claim 1, wherein the single site catalyst precursor has the formula:

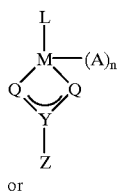

or

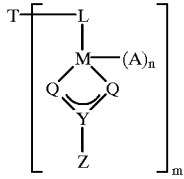

wherein: M is zirconium or hafnium;
L is a cycloalkadienyl ligand coordinated to M;
each Q is independently selected from the group consisting of —O—, —NR—, —CR$_2$— and —S—;
Y is C or S;
Z is selected from the group consisting of —OR, —NR$_2$, —CR$_3$, —SR, —SiR$_3$, —PR$_2$, —H, and aryl groups, with the proviso that when Q is —NR— then Z is selected from the group consisting of —OR, —NR$_2$, —SR, —SiR$_3$, —PR$_2$ and —H;

n is 1 or 2;
A is a univalent anionic group when n is 2 or A is a divalent anionic group when n is 1;
each R is independently a group containing carbon, silicon, nitrogen, oxygen, and/or phosphorus where one or more R groups may be attached to the L substituent;
T is a bridging group selected from the group consisting of alkylene and arylene groups containing from 1 to 10 carbon atoms, germanium, silicone and alkyl phosphine; and
m is 2 to 7.

3. The process of claim 1, wherein the single site catalyst precursor, the activating cocatalyst, and the 1-hexene are each in liquid form.

4. The process of claim 2, wherein the single site catalyst is selected from the group consisting of indenyl zirconium tris(diethylcarbamate), indenyl zirconium tris(trimethylacetate), and (methylcyclopentadienyl) zirconium tris(trimethylacetate).

5. The process of claim 1, wherein polymerization is conducted in the gas phase.

6. The process of claim 1, wherein the single site catalyst precursor is contacted with the electron donor before the single site catalyst precursor is contacted with the activating cocatalyst.

* * * * *